No. 788,336.

PATENTED APR. 25, 1905.

J. F. SHLEETER.
HORSE RELEASER.
APPLICATION FILED OCT. 28, 1904.

2 SHEETS—SHEET 2.

Witnesses

Inventor
J. F. Shleeter
Attorneys

No. 788,336. Patented April 25, 1905.

UNITED STATES PATENT OFFICE.

JAMES F. SHLEETER, OF LAKE LINDEN, MICHIGAN.

HORSE-RELEASER.

SPECIFICATION forming part of Letters Patent No. 788,336, dated April 25, 1905.

Application filed October 28, 1904. Serial No. 230,343.

*To all whom it may concern:*

Be it known that I, JAMES F. SHLEETER, a citizen of the United States, residing at Lake Linden, in the county of Houghton, State of Michigan, have invented certain new and useful Improvements in Horse-Releasers; and I do hereby declare the following to be a full, clear, and exact description of the invention, such as will enable others skilled in the art to which it appertains to make and use the same.

This invention relates to horse-releasers, and has for its object to provide a horse-releaser which will be combined in a harness and by means of which an animal may be released instantaneously, the major portion of the harness remaining attached to the vehicle.

Other objects and advantages will be apparent from the following description, and it will be understood that modifications of the specific construction shown may be made and any suitable materials may be used without departing from the spirit of the invention.

Figure 1:
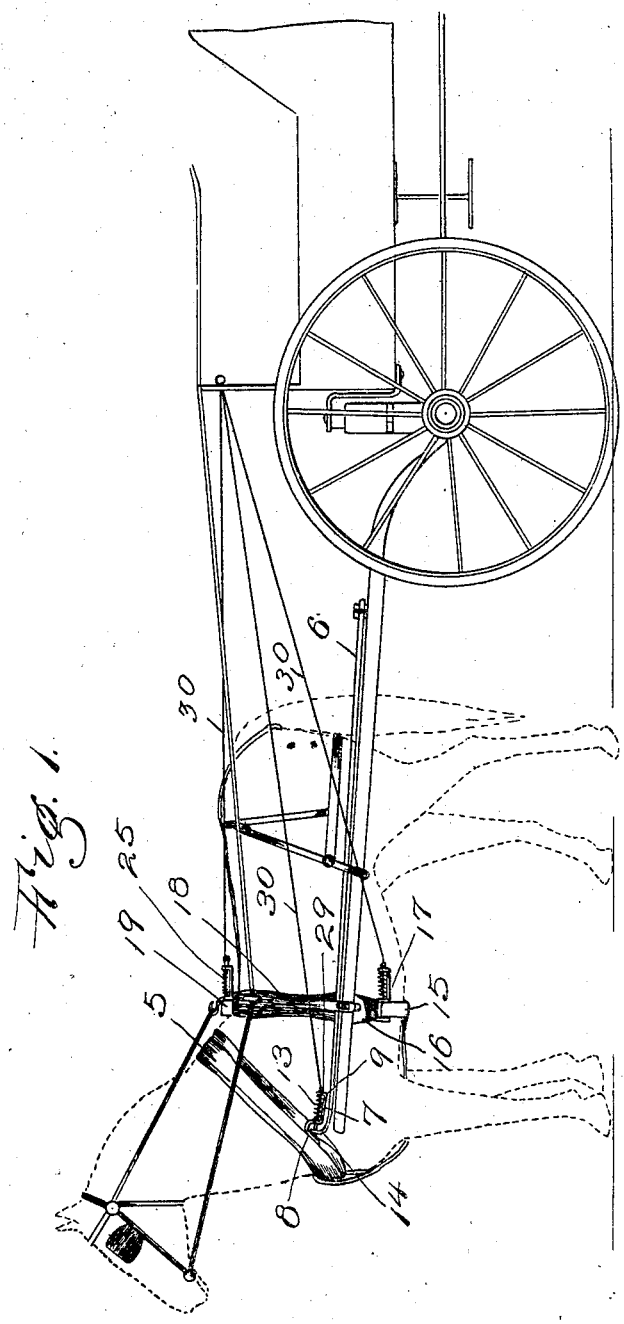
Figure 2:
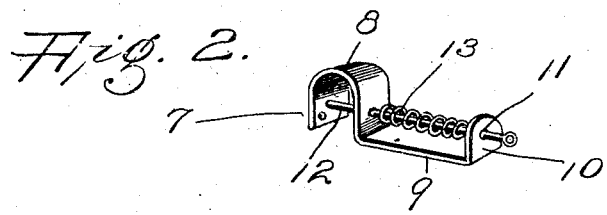
Figure 3:
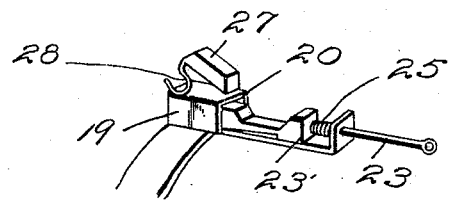
Figure 4:
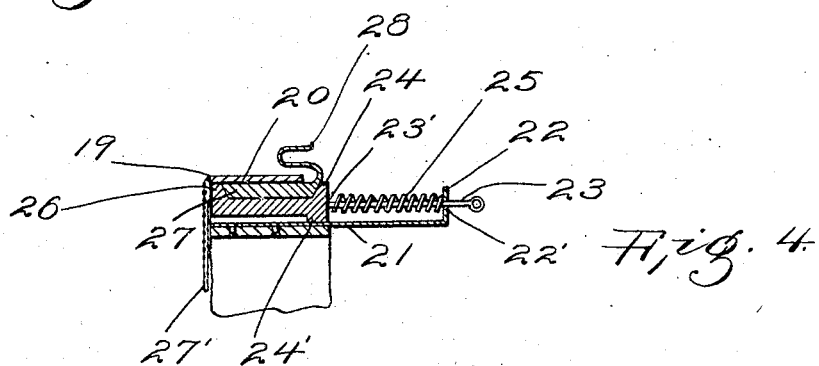
Figure 5:
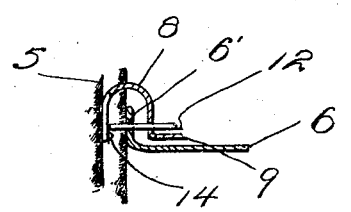

In the drawings forming a portion of this specification, and in which like numerals of reference indicate similar parts in the several views, Figure 1 is a view of the present invention applied to a wagon and illustrating a horse in dotted lines. Fig. 2 is a detail view of one of the snap-hooks. Fig. 3 is a view of the check-releasing mechanism, showing the shaft withdrawn. Fig. 4 is a sectional view of the check-releasing mechanism with the check-hook in its operative position. Fig. 5 is a view, partially in section, showing a trace engaged with the trace-fastener.

Referring now to the drawings, there is shown a harness including a collar 5, to which the traces 6 are connected by means of snap-hooks 7. These hooks are formed from metallic plates, which are bent to form U-shaped members 8, having laterally-extending shanks 9 at the ends of one leg, the shanks being formed by bending one leg of each of these U-shaped members at right angles, it being understood that these legs are longer than the others. The free ends of the shanks 9 are bent upwardly, as shown at 10, and formed through the spaced legs of the U-shaped member and the upwardly-turned portion 10 of each hook are perforations 11, in which there is slidably engaged a rod 12. Engaged with rod 12 between the upwardly-turned portion 10 and the innermost leg of the U-shaped member is a spring 13, which is secured to the rod adjacent to the U-shaped member, and by means of pins 14 passed through the outermost leg of each of the U-shaped members the two spring snap-hooks are secured to the collar 5. The traces 6 are provided with perforations 6', with which the rods 12 are engaged, the ends of the traces lying within the U-shaped members. At one side the belly-band 15 of the harness is secured to the back-strap 16 by means of a similar snap-hook 17, the end of the back-strap being secured to the bight of the U-shaped member 8 of this hook.

Secured to the saddle 18 of the harness there is a block 19, having a longitudinal passage 20 therethrough, and extending rearwardly from this block, at the lower end thereof, there is a plate 21, the free end of which is turned upwardly, as shown at 22, and is provided with a perforation 22'. Slidably engaged in the perforation 22' is a shaft 23, having upwardly and downwardly extending lugs 24 and 24' between the block 19 and the upwardly-turned end 22 of the plate 21, the lug 24' resting against the plate 21 and holding the inner end 23' of the shaft in position for movement into and out of the passage 20, and to hold the shaft normally with its end within the passage a spring 25 is engaged with shaft between the lugs 24 and 24' and the upwardly-turned end 22 of the plate. At its end 23' the shaft is provided with an upwardly-turned lug 26, and disposed upon the shaft between this lug and the lug 24 there is a block 27 of a size to enter the passage 20 with the shaft 23 and to lie when in this position with its rearward end flush with the rearward end of the block 19. Secured to the rearward end of the block 27 is a check-hook 28, which is arranged to extend forwardly over the block 19, with its bill directed rearwardly, as shown.

The ends of the rods 12 of the several snap-hooks beyond the upwardly-turned ends 10 of the shanks 9 are provided with rings 29, to which are secured cords 30, extending to the dashboard of the vehicle, to which they are secured, a similar cord being secured to the rearward end of the shaft 23, and when it is desired to release the horse these cords are pulled, which moves the rods 12 rearwardly to release the traces and belly-band, the shaft 23 being at the same time moved rearwardly to release the block 27, and thereby the check-rein. The block 27 may be secured to the block 19 by means of a chain 27', connected therewith, to prevent loss of the block 27. It will of course be understood that the lines are unbuckled before the animal is released to permit of their passage through the guide-rings upon the back-band.

What is claimed is—

1. In a harness, the combination with a back-strap, of a block connected with the back-strap and having a passage therethrough, a guide-plate secured to the block, a shaft slidably connected with the guide-plate and having a recess in its upper face adjacent to its forward end, said shaft being arranged for movement to bring its recessed portion into and out of the passage of the block, means for holding the shaft yieldably with its recessed portion in the passage, a block removably disposed in the recess and lying normally within the passage, a check-hook connected with the last-mentioned block and lying exteriorly of the passage, and a checkrein engaged with the hook, said shaft being movable against the action of the holding means to bring its recessed portion out of the passage to permit of the disengagement of the block therefrom.

2. A check-hook comprising a block having a passage therethrough, a guide-plate connected with the block and extending rearwardly therefrom, a shaft disposed upon the guide-plate for movement thereover into and out of the passage, said guide-plate having its rearward end turned upwardly and perforated, a rod secured to the shaft and slidably engaged in the perforation of the guide-plate, a spring disposed between the shaft and the upwardly-turned end of the guide-plate and arranged to hold the shaft normally within the passage, said shaft having a recess therein lying normally within the passage, a block removably disposed in the recess, and a hook connected with the block and lying outwardly of the passage when the block is in its normal position, said hook being adapted for the attachment of a checkrein thereto.

3. In a horse-releasing harness, the combination with a draft-yoke and a back-strap, of traces detachably connected with the yoke, a belly-band detachably connected with the back-strap, a block connected with the back-strap and having a passage therethrough, a guide-plate secured to the block, a shaft slidably connected with the guide-plate and having a recess in its upper face adjacent to its forward end, said shaft being arranged for movement to bring its recess portion into and out of the passage in the block, means for holding the shaft yieldably with its recess portion in the passage, a block removably disposed in the recess and lying normally within the passage, a check-hook connected with the last-named block and lying exteriorly of the passage, said hook being arranged for engagement with the checkrein, cords connected with the shaft and with the connections between the traces and the yoke and the band and back-strap, for movement of the latter into their inoperative positions, and for movement of the shaft to bring its recess portion out of the passage and release the second-named block.

In testimony whereof I affix my signature in presence of two witnesses.

JAMES F. SHLEETER.

Witnesses:
EMIL F. PRINCE,
L. S. CHABOT.